United States Patent [19]
Ozawa et al.

[11] Patent Number: 5,965,003
[45] Date of Patent: Oct. 12, 1999

[54] METHOD OF DECOMPOSING CMPO

[75] Inventors: Masaki Ozawa, Naka-gun; Yasumasa Tanaka, Hitachinaka; Yoshihiro Hoshino; Hiroyuki Tanuma, both of Chuo-ku; Chisako Kawakami, Kurashiki; Takamichi Kishi, Okayama, all of Japan

[73] Assignees: Doryokuro Kakunenryo Kaihatsu Jigyodan, Tokyo, Japan; Mitsui Engineering & Shipbuilding Co., Ltd., Tokyo, Japan; Chlorine Engineers Corp, Ltd., Tokyo, Japan

[21] Appl. No.: 09/035,064

[22] Filed: Mar. 5, 1998

[51] Int. Cl.$^6$ .............................. C25B 1/00; C25B 3/00; C25C 1/00; C25C 3/00
[52] U.S. Cl. .................. 205/352; 205/549; 205/555; 205/464; 205/688
[58] Field of Search ...................... 205/351, 352, 205/549, 555, 464, 688, 703

[56] References Cited

U.S. PATENT DOCUMENTS

| | | | |
|---|---|---|---|
| 4,617,125 | 10/1986 | Danesi | 210/638 |
| 4,835,107 | 5/1989 | Horwitz et al. | 436/82 |
| 5,855,760 | 1/1999 | Zen et al. | 205/555 |

*Primary Examiner*—Kathryn Gorgos
*Assistant Examiner*—Wesley A. Nicolas
*Attorney, Agent, or Firm*—Oliff & Berridge, PLC

[57] ABSTRACT

CMPO is safely, reliably and rapidly decomposed under mild conditions. A CMPO-containing substance is emulsified in an electrolyte comprising an oxidation promoter (silver ion) by an emulsifier in an emulsifying tank, this electrolyte comprising the CMPO-containing substance is supplied to an anode chamber, and an electrolytic oxidation reaction is performed by passing an electric current. By emulsifying the CMPO-containing substance, the surface area of CMPO in contact with electrolyte is increased, and electrolytic decomposition is thereby promoted. As sufficient CMPO decomposition is not obtained by passing the emulsion only once through an electrolysis tank 1, a batch oxidation method is employed wherein an anolyte is recirculated by a recirculating pump 3a through the anode chamber, a constant temperature bath 7a and an emulsifying tank 6, so that electrolysis is performed with the CMPO-containing substance permanently emulsified in the electrolyte. To maintain a catholyte in a cathode chamber at the same temperature as the anolyte, the catholyte is recirculated by a recirculating pump 3b between the cathode chamber and a constant temperature bath 7b. The current supplied to an anode 4 and cathode 5 in the electrolysis tank 1 is controlled by a rectifier 8.

15 Claims, 2 Drawing Sheets

5,965,003

METHOD OF DECOMPOSING CMPO

BACKGROUND OF THE INVENTION

This invention relates to a method of decomposing octyl (phenyl)-N,N-di-isobutyl carbamoyl methyl phosphine oxide ($C_{24}H_{42}NO_2P$, referred to hereafter as "CMPO"), a neutral organophosphorous compound having a double chair configuration, which is used for separating actinoids.

DESCRIPTION OF THE RELATED ARTS

CMPO has a high actinoid separating ability, and various studies are being carried out to explore its use as a promising new actinoid extracting agent. In the TRUEX method, for example, to separate transuranic elements and nuclear fission products (FP) containing trivalent actinoids such as Am and Cm from reprocessed, highly radioactive effluent, a mixed solvent comprising a blend of CMPO and tributylphosphoric acid (($C_4H_9O)_3PO$, referred to hereafter as TBP) in a hydrocarbon diluent (e.g., n-dodecane, chemical formula: $n-C_{12}H_{26}$) is used, and the transuranic elements are thereby extracted into the solvent.

However when CMPO which is the extracting agent is used for a long period of time, it deteriorates due to radiation damage and hydrolytic decomposition, its extracting efficiency declines, and as a result, highly radioactive organic effluent containing CMPO is produced. Until now, no effective method had been found for treating this CMPO-containing radioactive effluent.

It is therefore an object of this invention to provide a method of safely, reliably and rapidly decomposing CMPO under mild conditions.

SUMMARY OF THE INVENTION

To resolve the aforesaid problems, the method of decomposing CMPO according to this invention has the following features.

(1) A CMPO-containing substance is added to an electrolyte containing an oxidation promoter so as to emulsify the CMPO-containing substance in the electrolyte, the emulsion obtained is supplied to an anode chamber in an electrolysis cell partitioned by a membrane, and a current is passed to electrochemically decompose the CMPO-containing substance.

This permits oxidative degradation of CMPO under mild conditions.

(2) In the method of decomposing CMPO mentioned in (1) above, the aforesaid oxidization promoter is silver ion, and the aforesaid electrolyte is nitric acid solution.

Silver ion ($Ag^{2+}/Ag^+$ system) which is the oxidation promoter has a high redox potential, and since $Ag^{2+}$ is a metal ion with a high oxidizing power, CMPO can be oxidatively degraded efficiently even under mild conditions. Further, nitric acid solution which is widely used for actinoid separation is an electrolyte which is easy to handle, and it may be used to assist in the safe, oxidative degradation of CMPO.

DESCRIPTION OF THE PRESENT INVENTION

A preferred form of this invention will now be described.

In the method of decomposition according to this invention, the CMPO-containing substance is indirectly electrolytically oxidized and oxidatively degradated. In general, electrolytic decomposition proceeds under mild conditions and operating procedures involve no risk. Also, a major part of the CMPO molecule is hydrocarbon, so most of the products of oxidative degradation are easily discharged into the outside environment as carbon dioxide gas and water, and only phosphoric acid is left as a residue. Therefore, although CMPO is a large molecule, it is decomposed according to the method of this invention leaving only phosphoric acid, so generation of waste products is largely reduced (high volume reduction).

Since phosphoric acid is produced also in the treatment of fertilizers, methods have already been established to dispose of phosphoric acid. The end product of the decomposition may therefore also be safely, efficiently treated.

As stated above, CMPO is normally used is systems employing n-dodecane and TBP as solvents. Like CMPO, TBP also contains phosphorus, and as it can clearly be decomposed by the method described hereafter, a detailed description of the decomposition of TBP will be omitted. To avoid any confusion between the decomposition of CMPO and decomposition of TBP, the description given herein applies to a two-component system wherein CMPO is dissolved in the organic solvent decalin (decahydronaphthalene, chemical formula: $C_{10}H_{18}$).

A two-component solution of CMPO/decalin dissolves only slightly in an electrolyte (e.g., aqueous nitric acid solution), and it was found to be only slowly oxidized unless special measures are taken. To increase the oxidation rate, therefore, it is preferable to emulsify an electrolyte containing CMPO prior to electrolysis so as to increase the surface area of CMPO in contact with electrolyte.

It is moreover preferable to add silver ion ($Ag^+$) to the electrolyte, this silver ion functioning as an oxidation promoter. $Ag^+$ undergoes anodic oxidation ($Ag^+ \rightarrow Ag^{2+} + e^-$), thus converting it to $Ag^{2+}$ which has a high oxidizing power. Further, $Ag^{2+}$ reacts with water producing oxygen radicals ($O°$) which also have oxidizing properties ($2Ag^{2+} + H_2O \rightarrow 2Ag^+ + 2H^+ + O°$). These oxygen radicals accelerate the electrolytic oxidation of CMPO.

Figure 1:
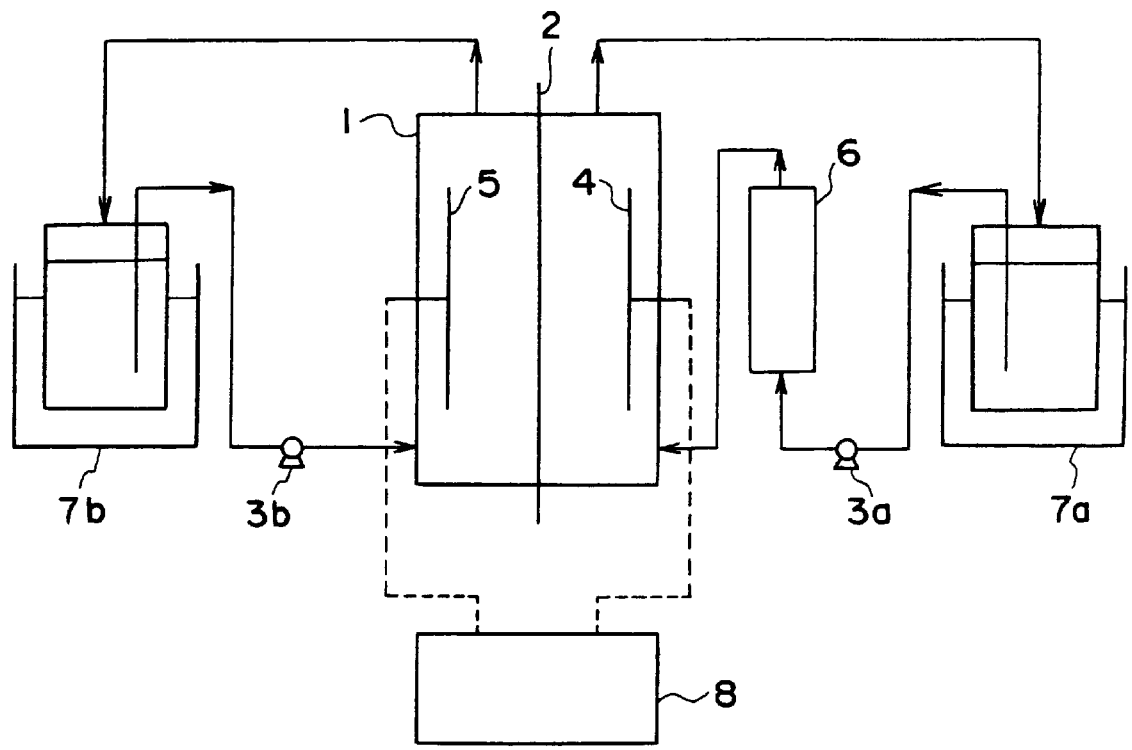
FIG. 1 is a diagram showing a typical construction of a device used in a method for decomposing CMPO according to this invention.

An electrolysis cell 1 used in this invention may have a two-chamber or three-chamber construction, however a two-chamber construction is preferable since it is simpler, as shown in FIG. 1. As shown in FIG. 1, the electrolysis cell 1 is partitioned by a membrane 2 (i.e., cation exchange membrane). The electrolyte containing CMPO is supplied to an anode chamber housing an anode 4. It should be noted that even if CMPO is supplied to a cathode chamber containing a cathode 5, CMPO cannot be decomposed. Also, no decomposition of CMPO takes place whatsoever in an electrolysis tank which does not make use of the membrane 2, as described hereafter. It was found that the electrolyte containing CMPO must be supplied to the anode chamber formed inside the electrolysis cell by partitioning the tank with the membrane.

The electrolysis cell 1 used in this invention can be manufactured from the following materials. The cell frame (i.e., the frame of the anode chamber and cathode chamber) of the electrolysis cell 1 may be formed of an acid-resistant metal or a plastic (e.g., PTFE). The anode 4 may be formed of platinum, or of titanium which has been electroplated or coated with platinum. The membrane 2 may be a perfluorosulfonic acid type ion exchange membrane, or it may be made of porous glass, porcelain or the like.

The electrolyte on the cathode side may be dilute nitric acid, sulfuric acid or phosphoric acid, however from the viewpoint of subsequent processing, it is preferable to use the same dilute nitric acid as for the anolyte.

According to this invention, phosphoric acid ion produced in the electrolyte solution was used as an indication of the progress of decomposition of CMPO. Many different products are generated by the electrolysis of CMPO, but it is thought that these are finally oxidized to carbon dioxide gas, water and phosphoric acid. For example, the following reaction has been postulated.

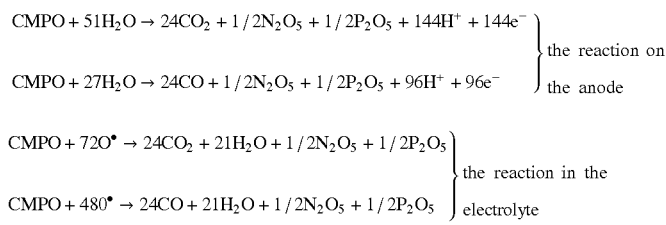

$$\left.\begin{array}{l} CMPO + 51H_2O \to 24CO_2 + 1/2N_2O_5 + 1/2P_2O_5 + 144H^+ + 144e^- \\ \\ CMPO + 27H_2O \to 24CO + 1/2N_2O_5 + 1/2P_2O_5 + 96H^+ + 96e^- \end{array}\right\} \begin{array}{l} \text{the reaction on} \\ \text{the anode} \end{array}$$

$$\left.\begin{array}{l} CMPO + 72O^{\bullet} \to 24CO_2 + 21H_2O + 1/2N_2O_5 + 1/2P_2O_5 \\ \\ CMPO + 48O^{\bullet} \to 24CO + 21H_2O + 1/2N_2O_5 + 1/2P_2O_5 \end{array}\right\} \begin{array}{l} \text{the reaction in the} \\ \text{electrolyte} \end{array}$$

The inventors therefore measured phosphoric acid ion in the solution after electrolysis. To perform this measurement, hydrochloric acid was added to the effluent after electrolysis to remove excess silver ion, and the effluent was evaporated to dryness on the water bath to remove nitric acid. Residual phosphoric acid ion was dissolved in water, and quantitatively determined by ion chromatography.

According to this invention, the electrolysis temperature may lie within a range of 0° C. to 100° C., but from the viewpoints of efficiency and prevention of corrosion of the materials forming the electrolysis cell, it is preferably from 40° C. to 60° C. The current density used may lie within a range of 1 mA/cm² to 3000 mA/cm² from the viewpoints of efficiency and processing speed, it is preferably from 200 mA/cm² to 500 mA/cm².

According to this invention, silver ion was added only to the anolyte. The source of silver ion used here is preferably silver nitrate as it has a high solubility and is most commonly encountered in actual practice. The concentration of silver ion added to the anolyte lies within a range of 0.001 mole/liter to 1 mole/liter, but from the viewpoints of efficiency and economic viability, it is preferably from 0.1 mole/liter to 0.5 mole/liter.

The concentration of nitric acid in the anolyte used in this invention lies within a range of 0.1 mole/liter to 10 mole/liter, but from the viewpoints of efficiency and suppression of corrosion of the component materials of the apparatus, it is preferably from 2 mole/liter to 4 mole/liter. The nitric acid concentration of the catholyte preferably lies within the same range as that of the anolyte.

The decomposition of CMPO according to the method of this invention may be performed in an apparatus of which a typical construction is shown in FIG. 1. First, the CMPO-containing substance is emulsified in an electrolyte by an emulsifier in an emulsifying tank 6, and this emulsion is supplied to the anode chamber. The emulsification of the CMPO-containing substance increases the surface area of CMPO in contact with electrolyte, and thereby promotes electrolytic decomposition. However, as sufficient CMPO decomposition is not obtained by passing the emulsion through the electrolysis cell 1 only once, a batch oxidation method is used wherein the anolyte is recirculated through the anode chamber, a constant temperature bath 7a and the emulsifying tank 6 by a recirculating pump 3a. In this way, electrolysis is performed continuously with the CMPO-containing substance constantly in contact with electrolyte. To maintain the cathode chamber at the same temperature as that of the anode chamber, the catholyte is also recirculated through the cathode chamber and a constant temperature bath 7b by a recirculating pump 3b. The current supplied to the anode 4 and cathode 5 in the electrolysis cell 1 is controlled by a rectifier 8.

There is no particular limitation on the emulsifier in the emulsifying tank 6, it being possible to use various types of device known in the art. It will be understood that in practice, when CMPO-containing effluent is treated by the TRUEX method, the emulsifier used will be manufactured from materials conforming to specifications indicating their resistance to radioactivity.

Due to differences in electrolysis conditions, no specific rules can be given regarding the amount of CMPO added to the anolyte according to this invention, however it is preferable that the amount added is equivalent to or less than the amount of electricity passed. According to this invention, the oxidation of CMPO does not take place selectively, and in practice, the decomposition of CMPO is also accompanied by various side-reactions. It is therefore preferable that the amount of CMPO added is determined by the electrolysis conditions.

Figure 2:
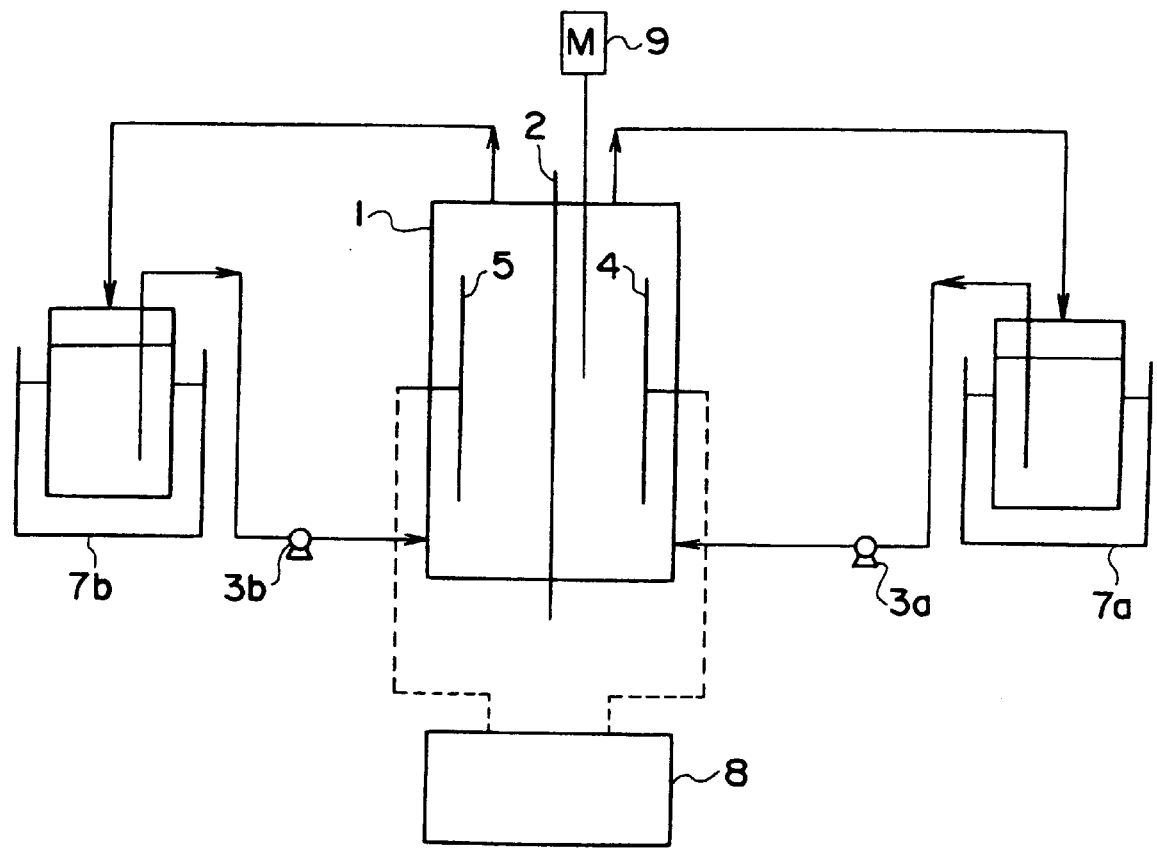
FIG. 2 is a diagram showing another construction of a device used in a method for decomposing CMPO according to this invention.

The apparatus used to decompose CMPO according to this invention is not limited to the apparatus shown in FIG. 1, the apparatus shown in FIG. 2 being one alternative. The same component elements of the CMPO decomposition apparatus are assigned the same symbols, and their description will not be repeated herebelow.

In the apparatus shown in FIG. 1, a separate emulsifying tank 6 was provided, and the CMPO-containing substance was recirculated between the anode chamber and emulsifying tank 6 so that it was supplied to the anode chamber while permanently emulsified in the electrolyte. However in the apparatus shown in FIG. 2, an ultrasonic homogenizer 9 for example may be provided in the anode chamber of the electrolysis tank 1 to constantly emulsify the anolyte in the chamber. Examples of such an ultrasonic homogenizer are "VP-5S", "VP-15S", VP-30S" and VP-60S" (Commercial name of Taitech K. K.) having an ultrasonic frequency of 20 kHz.

DESCRIPTION OF THE ACTUAL EXAMPLES

Next, this invention will be described in detail with reference to specific examples. The CMPO decomposition apparatus used in the examples has the construction shown in FIG. 1. A small-scale experimental CMPO decomposition apparatus was manufactured. The specification of the electrolysis tank was as follows.

Electrolysis Cell

Anode chamber: capacity 100 ml, PTFE

Cathode chamber: capacity 100 ml, PTFE

Anode 4: platinum electroplating/coating (platinum electroplated on titanium)

Cathode 5: platinum electroplating/coating (platinum electroplated on titanium)

Membrane 2: perfluorosulfonic acid membrane (commercial name: Nafion 450, commercial name of Dupont)

Gaskets: Gore-tex® (PTFE) (commercial name of Japan Gore-tex)

Pipes: PFA

The emulsifier in the emulsifying tank 6 was a "VIBRO MIXER" (commercial name of Reika Kogyo K. K.). The electrolyte was pre-treated at a vibration frequency of 70 for an emulsification time of 15 min.

Examples 1–5

Batch oxidation was performed varying the CMPO addition amount in an electrolysis apparatus having the construction shown in FIG. 1. The current density was 500 mA/cm$^2$, electrolysis time was 3 hours, electrolysis temperature was 50° C., anolyte composition was 2M nitric acid and 0.5M AgNO$_3$, catholyte composition was 2M nitric acid, anolyte amount was 300 ml and catholyte amount was 300 ml. CMPO was added to the electrolyte in the form of a 0.2M solution in decalin. After treatment, the amount of phosphoric acid ion in the electrolyte was measured, and the decomposition rate of CMPO was calculated. Table 1 shows the relation between the CMPO addition amount and CMPO decomposition rate.

TABLE 1

| Examples | CMPO addition amount (g) | CMPO decomposition rate (%) |
|---|---|---|
| 1 | 0.27 | 60 |
| 2 | 0.48 | 63 |
| 3 | 0.96 | 67 |
| 4 | 1.97 | 53 |
| 5 | 2.97 | 32 |

Examples 6–8

Electrolysis was performed based on the methods described in the aforesaid examples 1–5 under the conditions of current density 500 mA/cm$^2$, electrolysis time 3 hours, anolyte 3M nitric acid and 0.5M AgNO$_3$, catholyte 3M nitric acid, anolyte amount 300 ml, catholyte amount 300 ml and CMPO addition amount 0.48 g, at different electrolysis temperatures. The amount of phosphoric acid ion in the electrolyte was measured. Table 2 shows the relation between the electrolysis temperature and CMPO decomposition rate.

TABLE 2

| Examples | Electrolysis temperature (° C.) | CMPO decomposition rate (%) |
|---|---|---|
| 6 | 35 | 60 |
| 7 | 50 | 94 |
| 8 | 60 | 79 |

Examples 9–12

Electrolysis was performed based on the methods described in the aforesaid Examples 1–5 under the conditions of current density 500 mA/cm$^2$, electrolysis time 3 hours, anolyte silver ion concentration 0.5M, anolyte amount 300 ml, catholyte amount 300 ml, CMPO addition amount 0.48 g and electrolysis temperature 50° C., at different anolyte and catholyte nitric acid concentrations. The amount of phosphoric acid ion in the electrolyte was measured. Table 3 shows the relation between the anolyte and catholyte nitric acid concentrations, and CMPO decomposition rate.

TABLE 3

| Examples | Anolyte and catholyte nitric acid concentration (M) | CMPO decomposition rate (%) |
|---|---|---|
| 9 | 1.8 | 63 |
| 10 | 3.0 | 94 |
| 11 | 4.0 | 73 |
| 12 | 5.0 | 67 |

Examples 13–19

Electrolysis was performed based on the methods described in the aforesaid Examples 1–5 under the conditions of current density 500 mA/cm$^2$, electrolysis time 3 hours, anolyte nitric acid concentration 3.0M, catholyte nitric acid concentration 2.0M, anolyte amount 300 ml, catholyte amount 300 ml, CMPO addition amount 0.48 g and electrolysis temperature 50° C., at different anolyte silver ion concentrations. The amount of phosphoric acid ion in the electrolyte was measured. Table 4 shows the relation between the anolyte silver ion concentration and CMPO decomposition rate. In Example 19, electrolysis was performed under the same conditions as those of Examples 13–18 excepting that silver ion was not added.

TABLE 4

| Examples | Anolyte and catholyte nitric acid concentration (M) | CMPO decomposition rate (%) |
|---|---|---|
| 13 | 0.005 | 76 |
| 14 | 0.01 | 82 |
| 15 | 0.10 | 88 |
| 16 | 0.30 | 97 |
| 17 | 0.50 | 94 |
| 18 | 0.70 | 91 |
| 19 | 0 | 50 |

Comparative Example 1

Batch oxidation or processing was performed under the conditions of current density 500 mA/cm$^2$, electrolysis time 3 hours, electrolysis temperature 50° C., anolyte composition 2M nitric acid and 0.5M AgNO$_3$, anolyte amount 600 ml and CMPO addition amount 0.48 g, without using a membrane. Table 5 shows the CMPO decomposition rate.

Comparative Example 2

Electrolyis was performed under the same conditions as those of Example 16 excepting that an emulsifier was not used.

TABLE 5

| Comparative Examples | CMPO decomposition rate (%) |
|---|---|
| 1 | 0 |
| 2 | 5 |

From the above results, it was found that CMPO can be easily decomposed according to the method of this invention.

It will be understood however that the invention is not to be construed as being limited by the above examples.

Therefore according to this invention, the substance CMPO for which no disposal method existed in the prior art can be oxidatively degraded safely and efficiently under mild conditions. Moreover, as the oxidation products are phosphoric acid ion, carbon dioxide gas and water, the amount of highly radioactive waste produced can be reduced.

What is claimed:

1. A method for decomposing octyl phenyl-N,N-di-isobutyl carbamoyl methyl phosphine oxide (CMPO) comprising the steps of:

adding a CMPO-containing substance to an electrolyte comprising an oxidation promoter, emulsifying said CMPO-containing substance, decomposing said CMPO-containing substance electrochemically by supplying the emulsion obtained to an anode chamber in an electrolysis tank partitioned by a membrane and passing an electric current.

2. A method for decomposing CMPO as defined in claim 1, wherein said oxidation promoter is silver ion.

3. A method for decomposing CMPO as defined in claim 1, wherein said electrolyte is at least one electrolyte chosen from aqueous nitric acid, aqueous sulfuric acid and aqueous phosphoric acid.

4. A method for decomposing CMPO as defined in claim 1, wherein said electrolyte is aqueous nitric acid.

5. A method for decomposing CMPO as defined in claim 1, wherein said membrane is at least one membrane chosen from a perfluorosulfonic acid ion exchange membrane, porous glass and porcelain.

6. A method for decomposing CMPO as defined in claim 1, wherein the electrolysis temperature in the electrochemical decomposition of said CMPO-containing substance lies within a range of 0° C. to 100° C.

7. A method for decomposing CMPO as defined in claim 1, wherein the electrolysis temperature in the electrochemical decomposition of said CMPO-containing substance lies within a range of 40° C. to 60° C.

8. A method for decomposing CMPO as defined in claim 1, wherein the electrode current density in the electrochemical decomposition of said CMPO-containing substance lies within a range of 1 $mA/cm^2$ to 300 $mA/cm^2$.

9. A method for decomposing CMPO as defined in claim 1, where the electrode current density in the electrochemical decomposition of said CMPO-containing substance lies within a range of 200 $mA/cm^2$ to 500 $mA/cm^2$.

10. A method for decomposing CMPO as defined in claim 1, wherein the concentration of silver ion added to the anolyte in said anode chamber lies within a range of 0.001 mole/liter to 1 mole/liter.

11. A method for decomposing CMPO as defined in claim 2, wherein the concentration of silver ion added to the anolyte in said anode chamber lies within a range of 0.1 mole/liter to 0.5 mole/liter.

12. A method for decomposing CMPO as defined in claim 4, wherein the nitric acid concentration of the anolyte in said anode chamber lies within a range of 0.1 mole/liter to 10 mole/liter.

13. A method for decomposing CMPO as defined in claim 4, wherein the nitric acid concentration of the anolyte in said anode chamber lies within a range of 2 mole/liter to 4 mole/liter.

14. A method for decomposing CMPO as defined in claim 1, wherein an emulsifying tank is provided for emulsifying said CMPO-containing substance in said electrolyte, and said CMPO-containing substance is electrochemical decomposed by repeating a continuous sequence of operations comprising the steps of passing an electric current through said electrolyte comprising said emulsified CMPO-containing substance in said anode chamber of said electrolysis tank, returning said electrolyte to said emulsifying tank to re-emulsify said CMPO-containing substance, and again passing an electric current through said electrolyte in said anode chamber of said electrolysis tank.

15. A method for decomposing CMPO as defined in claim 1, wherein an ultrasonic homogenizer is provided in said anode chamber of said electrolysis tank so that said CMPO-containing substance is electrochemically decomposed while said anolyte in said, anode chamber is permanently emulsified.

* * * * *